United States Patent
Ito et al.

(10) Patent No.: US 12,414,010 B2
(45) Date of Patent: Sep. 9, 2025

(54) PROCESSING APPARATUS OF CELL-FREE COMMUNICATION SYSTEM

(71) Applicants: KDDI Research, Inc., Fujimino (JP); University of Southern California, Los Angeles, CA (US)

(72) Inventors: Masaaki Ito, Fujimino (JP); Issei Kanno, Fujimino (JP); Yoshiaki Amano, Fujimino (JP); Andreas F. Molisch, Los Angeles, CA (US)

(73) Assignees: KDDI Research, Inc., Fujimino (JP); University of Southern California, California (CA)

( * ) Notice: Subject to any disclaimer, the term of this patent is extended or adjusted under 35 U.S.C. 154(b) by 362 days.

(21) Appl. No.: 18/124,808

(22) Filed: Mar. 22, 2023

(65) Prior Publication Data

US 2024/0323762 A1    Sep. 26, 2024

(51) Int. Cl.
*H04W 28/086* (2023.01)
*H04W 72/121* (2023.01)

(52) U.S. Cl.
CPC ....... *H04W 28/086* (2023.05); *H04W 72/121* (2013.01)

(58) Field of Classification Search
CPC ............. H04W 72/121; H04W 28/086; H04W 52/0206; H04W 88/085; H04W 16/18; H04W 16/28; H04W 88/18; H04B 7/0452; H04B 7/0617; H04B 7/0478; H04B 7/022; Y02D 30/70
See application file for complete search history.

(56) References Cited

PUBLICATIONS

Emil Björnson et al., "Scalable Cell-Free Massive MIMO Systems", IEEE Transactions on Communications, Jul. 2020, pp. 4247-4261, vol. 68, No. 7 (15 pages).
Hien Quoc Ngo et al., "Cell-Free Massive MIMO Versus Small Cells", IEEE Transactions on Wireless Communications, Mar. 2017, pp. 1834-1850, vol. 16, No. 3 (17 pages).

*Primary Examiner* — Jung Liu
(74) *Attorney, Agent, or Firm* — Foley & Lardner LLP

(57) ABSTRACT

The method includes: executing, when first APs that are changed from a cluster AP to a non-cluster AP due to a change of a cluster occurs, first processing on processing target APs including the first APs and a second AP that is the non-cluster AP satisfying a predetermined condition in relation to the first APs, and thereby determining, as an operation mode of the processing target APs. The first processing includes: selecting one first processing target AP from the processing target APs, and determining a downstream-only mode as the operation mode of the one first processing target AP, and determining a upstream-only mode or a sleep mode as the operation mode of a second processing target AP that is different from the one first processing target AP and is among the processing target APs.

11 Claims, 3 Drawing Sheets

PROCESSING APPARATUS OF CELL-FREE COMMUNICATION SYSTEM

BACKGROUND OF THE INVENTION

Field of the Invention

The present disclosure relates to a cell-free communication system.

Description of the Related Art

In a cellular communication system, a service-provided area is divided into a plurality of cells, and communication services are provided by deploying base station in the respective cells. In such a cellular communication system, each wireless device (WD), which is also referred to as a user equipment (UE), communicates with a base station of a cell in which this WD is present. In the cellular communication system, the communication quality in a boundary region of a cell is likely to decrease due to power attenuation of radiowaves from the base station and interference from neighboring cells.

For this reason, H. Q. Ngo, A. Ashikhmin, H. Yang, E. G. Larsson and T. L. Marzetta, "Cell-free massive MIMO versus small cells," in IEEE Trans. Wireless Commun., vol. 16, no. 3, pp. 1834-1850, March 2017 (hereinafter, referred to as Non-patent Literature 1) discloses a cell-free communication system. Similarly to a cellular communication system, also in the cell-free communication system, a plurality of access point (AP) are deployed in various geographical locations. The plurality of APs are connected to a central processing unit (CPU) via transmission paths. In the cell-free communication system, for example, the CPU selects one or more APs with which a WD is to wirelessly communicate, from the plurality of APs. The WD transmits/receives wireless signals to/from the one or more AP selected by the CPU, thereby communicating with the CPU via the one or more APs.

In the cell-free communication system, there is no conventional concept of "cell", and one or more APs that communicate with each WD are dynamically controlled by the CPU. A group of the one or more APs that communicate with one WD is referred to as a "cluster" for the one WD or a "cluster" associated with the one WD.

E. Björnson and L. Sanguinetti, "Scalable cell-free massive MIMO systems," in IEEE Trans. Commun., vol. 68, no. 7, pp. 4247-4261, July 2020 (hereinafter, referred to as Non-patent Literature 2) discloses cluster forming processing for forming a cluster for a WD, that is performed when the WD initially accesses a cell-free communication system.

There is desire to suppress consumed power of a cell-free communication system.

SUMMARY OF THE INVENTION

The present disclosure provides a technique for suppressing consumed power of a cell-free communication system.

According to an aspect of the present disclosure, a method performed by a processing apparatus of a cell-free communication system that includes a plurality of access points (APs) is provided. Each of the plurality of APs are classified into a cluster AP and a non-cluster AP, the cluster AP being an AP that is included in a cluster, which is a set of APs and is associated with a wireless device, and the non-cluster AP being an AP that is not included in the cluster. The method includes: executing, when one or more first APs that are changed from the cluster AP to the non-cluster AP due to a change of the cluster occurs, first processing on one or more processing target APs including the one or more first APs and a second AP that is the non-cluster AP satisfying a predetermined condition in relation to the one or more first APs, and thereby determining, as an operation mode of the one or more processing target APs, one of a downstream-only mode in which no wireless signal is received, an upstream-only mode in which no wireless signal is transmitted, and a sleep mode in which no wireless signal is transmitted or received; and controlling the one or more processing target APs such that the one or more processing target APs operate in the operation mode determined in the first processing. The first processing includes: selecting one first processing target AP from the one or more processing target APs, and determining the downstream-only mode as the operation mode of the one first processing target AP, and determining the upstream-only mode or the sleep mode as the operation mode of a second processing target AP that is different from the one first processing target AP and is among the one or more processing target APs.

Further features of the present invention will become apparent from the following description of exemplary embodiments with reference to the attached drawings.

DESCRIPTION OF THE EMBODIMENTS

Figure 1:
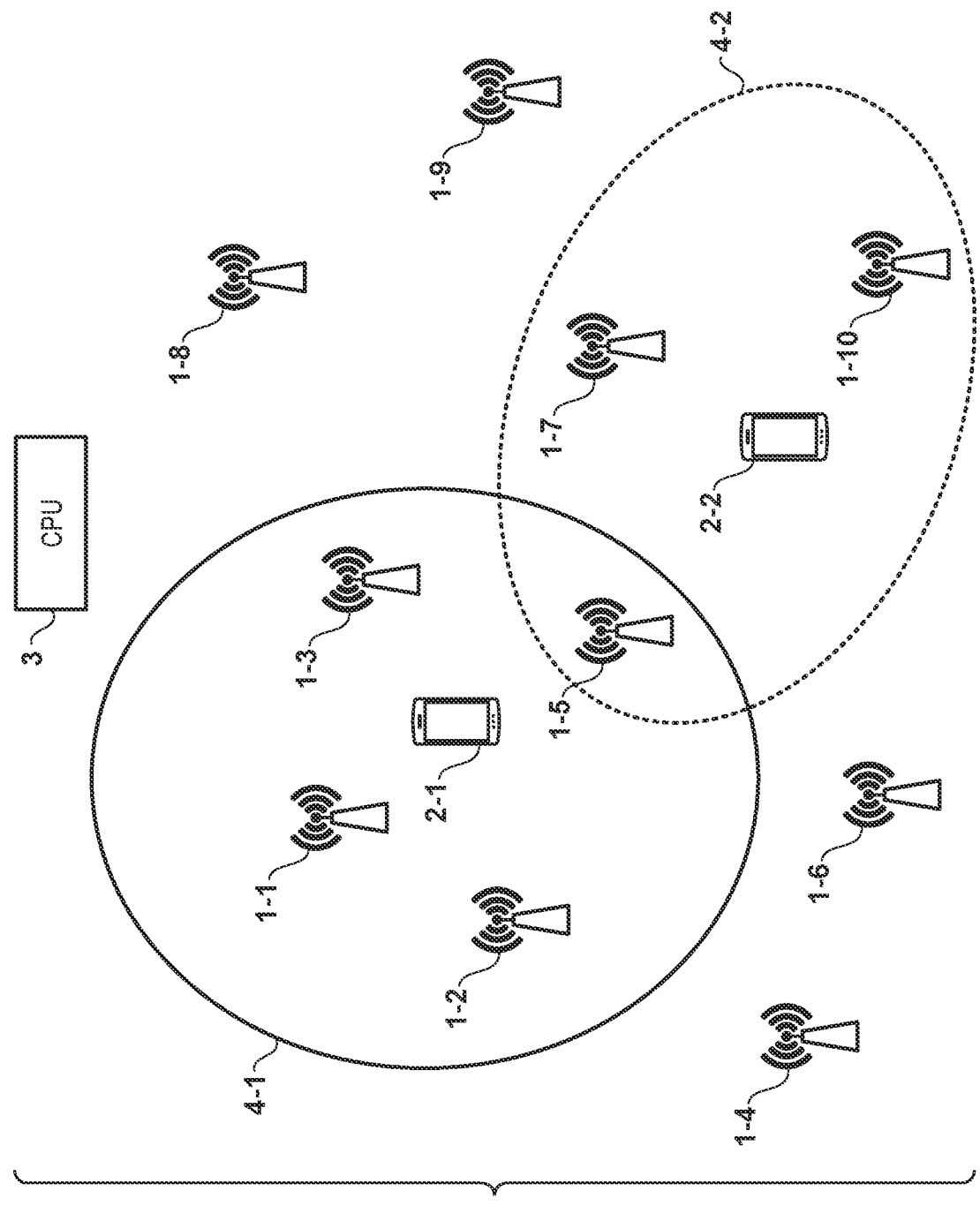
FIG. 1 is a diagram of a configuration of a cell-free communication system that is used for describing an embodiment.

Hereinafter, embodiments will be described in detail with reference to the attached drawings. Note, the following embodiments are not intended to limit the scope of the claimed invention, and all of the combinations of features described in the embodiments are not necessarily essential. Two or more features among a plurality of features described in the embodiments may be combined as appropriate. Furthermore, the same reference numerals are given to the same or similar configurations, and redundant description thereof is omitted.

FIG. 1 is a diagram of a configuration of a cell-free communication system that is used for describing an embodiment of the present invention. In FIG. 1, the cell-free communication system includes a plurality of APs 1-1 to 1-10. In the following description, the APs 1-1 to 1-10 are each referred to as an "AP 1" when there is no need to distinguish them from one another. In FIG. 1, the number of APs 1 is 10, which is exemplary, and the number of APs 1 in the cell-free communication system is not limited to 10. The APs 1 are connected to a CPU 3 using wired and/or wireless communication links. Furthermore, the CPU 3 is connected to a core network (not illustrated). Note that, in FIG. 1, for ease of illustration, communication links that connect the APs 1 to the CPU 3 are omitted.

In addition, FIG. 1 shows two WDs, namely a WD 2-1 and a WD 2-2. In the following description, the WD 2-1 and the WD 2-2 are each referred to as a "WD 2" when there is no need to distinguish them from each other. The APs 1-1 to 1-3 and 1-5 in the solid line circle in FIG. 1 are in a cluster 4-1 for the WD 2-1. In addition, the APs 1-5, 1-7, and 1-10 in the dotted line circle in FIG. 1 are in a cluster 4-2 for the WD 2-2. Therefore, the WD 2-1 wirelessly communicates with the APs 1-1 to 1-3 and 1-5 included in the cluster 4-1, thereby communicating with the CPU 3 via the APs 1-1 to 1-3 and 1-5. Similarly, the WD 2-2 wirelessly communicates with the APs 1-5, 1-7, and 1-10 included in the cluster 4-2, thereby communicating with the CPU 3 via the APs 1-5, 1-7, and 1-10.

Note that, in the following description, an AP 1 included in any cluster for a WD 2 is referred to as a "cluster AP", and an AP 1 that is not included in any cluster is referred to as a "non-cluster AP". In FIG. 1, the APs 1-1, 1-2, 1-3, 1-5, 1-7, and 1-10 are cluster APs. On the other hand, in FIG. 1, APs 1-4, 1-6, 1-8, and 1-9 are non-cluster APs.

The CPU 3 dynamically controls clusters for WDs 2. Therefore, in FIG. 1, the AP 1-2 is a cluster AP, but the AP 1-2 can be excluded from the cluster 4-1 and become a non-cluster AP, due to movement of the WD 2-1. Conversely, in FIG. 1, the AP 1-9 is a non-cluster AP, but can be included in the cluster 4-2 and become a cluster AP, due to movement of the WD 2-2.

In the present embodiment, an AP 1 is configured to operate in one of four operation modes. A first operation mode is a normal mode in which both transmission and receiving of a wireless signal are performed. A second operation mode is a downstream-only mode in which transmission of a wireless signal is performed, but receiving of a wireless signal is not performed. The downstream-only mode is a mode for notifying the WD 2 of the presence of the AP 1, and the AP 1 set to the downstream-only mode broadcasts a synchronization signal, system information, and the like. A wireless signal receiving circuit of the AP 1 operating in the downstream-only mode is set to a state where consumed power thereof is smaller than that of a wireless signal receiving circuit of an AP 1 operating in the normal mode.

A third operation mode is an upstream-only mode in which a signal from the WD 2 is received, and is then transmitted to the CPU 3, but no wireless signal is transmitted. A wireless signal transmission circuit of an AP 1 operating in the upstream-only mode is set to a state where consumed power thereof is smaller than that of a wireless signal transmission circuit of an AP 1 operating in the normal mode. A fourth operation mode is a sleep mode in which no wireless signal is transmitted or received. Both a wireless signal transmission circuit and a receiving circuit of an AP 1 operating in the sleep mode are set to a state where consumed power thereof is smaller than those of an AP 1 operating in the normal mode.

Consumed power of an AP 1 is largest in the normal mode, second largest in the downstream-only mode, third largest in the upstream-only mode, and smallest in the sleep mode.

In the present embodiment, the CPU 3 determines operation modes of APs 1. First, the CPU 3 determines the normal mode as the operation mode of a cluster AP. On the other hand, the CPU 3 determines an operation mode of a non-cluster AP using the processing shown in FIG. 2. The flowchart in FIG. 2 will be described below.

In step S10, the CPU 3 initializes a counter value C to 0. In step S1, the CPU 3 determines whether or not there is at least one AP 1 that was excluded from a cluster due to a change in the cluster and thus became a non-cluster AP. Note that, although not shown in the flowchart, if there is at least one AP 1 that has been changed from a non-cluster AP to a cluster AP due to a change in the cluster, the CPU 3 transmits a control signal to the at least one AP 1, and sets the at least one AP 1 to the normal mode. If there is at least one AP 1 that has been changed from a cluster AP to a non-cluster AP, the CPU 3 determines in step S13 whether or not the counter value C is a positive predetermined value. If the counter value C is not a positive predetermined value, the CPU 3 performs first processing to be described later, in step S16, and increments the counter value by 1 in step S17. The CPU 3 then repeats the processing from step S11.

On the other hand, in step S11, if there is no AP 1 that has changed from a cluster AP to a non-cluster AP, the CPU 3 determines, in step S12, whether or not a processing timing has come. The processing timing is a cyclic timing. Note that the cycle of processing timing is set to be a longer time period than an average time period during which a cluster is changed. If the processing timing has not come, the CPU 3 repeats the processing from step S11. On the other hand, when the processing timing has come, the CPU 3 performs, in step S14, second processing to be described later, initializes the counter value C to 0 in step S15, and repeats the processing from step S11. Note that, in step S13, also when the counter value C is a positive predetermined value, the CPU 3 performs the second processing in step S14.

Figure 2:
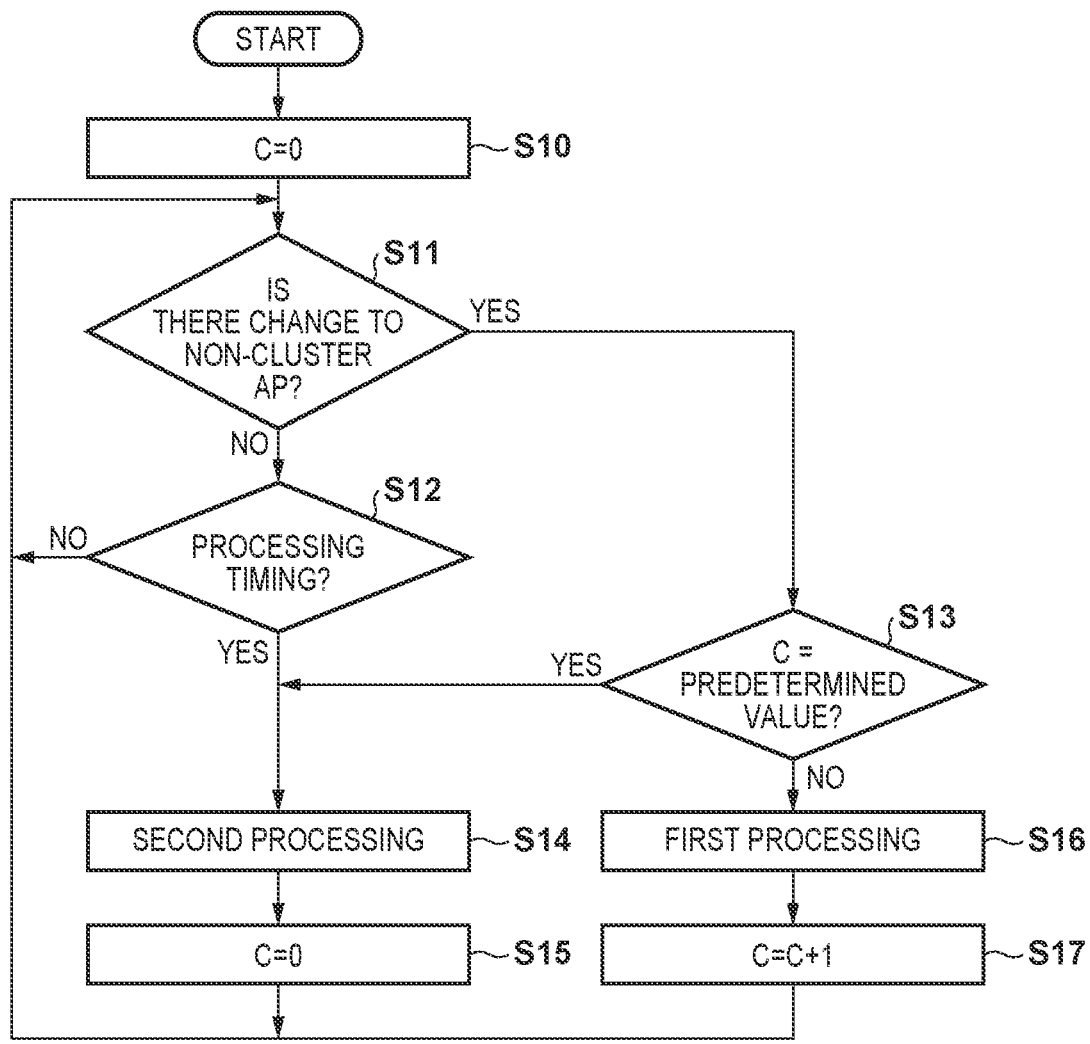
FIG. 2 is a flowchart of processing for determining an operation mode according to the embodiment.

Summarizing the flowchart in FIG. 2, when at least one AP 1 is changed from a cluster AP of a cluster to a non-cluster AP due to a change in the cluster, the CPU 3 basically performs the first processing. Note that, when a plurality of clusters are changed at substantially the same time, and there is an AP 1 that changed to a non-cluster AP from a cluster AP in each of the clusters, the CPU 3 performs the first processing individually for each cluster. In addition, the CPU 3 performs the second processing in a predetermined cycle. Note that, if the first processing is performed a predetermined number of times during a period from when the second processing is performed until the timing for performing the next second processing arrives, the CPU 3 performs the second processing.

First, the first processing will be described. The CPU 3 determines a non-cluster AP to which the distance from one among one or more APs 1 that became non-cluster APs due to a change in the cluster is within a predetermined threshold. Hereinafter, one or more APs 1 that have been changed from cluster APs to non-cluster APs, and a non-cluster AP whose distance from one among the one or more APs 1 is within a threshold are referred as "processing target APs". If the number of processing target APs is three or larger, the CPU 3 determines the distance between every two processing target APs among the three or more processing target APs, and determines the downstream-only mode as the operation mode of a processing target AP for which the dispersion of distances from other processing target APs is the smallest. This corresponds to setting a processing target AP in the vicinity of the center of a region in which the processing target APs are deployed, to the downstream-only mode. Note that, if the number of processing target APs is one, the CPU 3 determines the downstream-only mode as the operation mode of this processing target AP. In addition, when the number of processing target APs is two, the CPU 3 determines one processing target AP using any method, and determines the downstream-only mode as the operation mode of the determined processing target AP.

If the number of processing target APs is two or larger, the CPU 3 sets about half of the remaining processing target APs to the upstream-only mode, and the other half to the sleep mode. The CPU 3 determines the number of processing target APs that are set to the upstream-only mode, such that it is the same as the number of processing target APs that are set to the sleep mode, or larger than that by one, for example. Note that the CPU 3 determines operation modes of the remaining processing target APs such that processing target APs targeted for processing that are set to the upstream-only mode do not geographically concentrate. Once determining the operation modes of the processing target APs, the CPU 3 transmits control signals to the processing target APs, and performs control such that the processing target APs operate in the determined operation modes.

Next, the second processing will be described. The second processing is performed on at least all of the non-cluster APs among the APs 1 that are managed by the CPU 3. First, the CPU 3 divides all of the non-cluster APs into groups based on the positions at which the non-cluster APs are deployed, using the K-means method, for example. Note that the number of groups is a function of the number of clusters, and is smaller for a larger number of clusters in a range from a lower limit value to an upper limit value. The CPU 3 performs the first processing on a non-cluster AP included in each group as a processing target AP, and thereby determines the operation mode of the non-cluster AP included in the group.

Consumed power of the cell-free communication system is minimized by setting all of the non-cluster APs to the sleep mode, for example. However, when there is only an AP 1 in the sleep mode near a WD 2 in the idle mode, the WD 2 in the idle mode cannot recognize the presence of the AP 1. Therefore, there is a need to deploy, in a geographically dispersed manner, APs 1 that are operated in the downstream-only mode. In addition, there is also a need to deploy, in a geographically dispersed manner, APs 1 in the upstream-only mode that receive a random access signal or the like transmitted from the WD 2 in the idle mode when the WD 2 in the idle mode accesses the cell-free communication system, and that transmit the received signal to the CPU 3.

In the present embodiment, each time a non-cluster AP is created, operation modes of non-cluster APs in a predetermined region that is based on the non-cluster AP are determined. At this time, by operating, in the downstream-only mode, a non-cluster AP in the vicinity of the center of the predetermined region, a situation is suppressed where the WD 2 cannot receive a signal from an AP 1. Furthermore, by operating, in the upstream-only mode, about half of the remaining non-cluster APs in the predetermined region, it is possible to suppress a situation where a wireless signal transmitted by the WD 2 cannot be transferred to the CPU 3.

In this manner, in a range required for the WD 2 in the idle mode, a non-cluster AP that is operated in the downstream-only mode and non-cluster APs that are operated in the upstream-only mode are deployed, the other APs are operated in the sleep mode, and thereby it is possible to suppress the consumed power of the cell-free communication system.

Note that the first processing is local processing for determining an operation mode of a non-cluster AP in a predetermined region that is based on a position at which an AP 1 that has become a non-cluster AP is deployed. For this reason, when only the first processing is repeated, operation modes of non-cluster APs can be biased, for example. For this reason, in the present embodiment, when the first processing is performed a predetermined number of times, or each time a predetermined time period elapses, the second processing is performed.

In the second processing, at least all of the non-cluster APs that are managed by the CPU 3 are divided into groups based on the positions at which those non-cluster APs are deployed, and one non-cluster AP that is operated in the downstream-only mode is determined for each of the groups. The remaining APs 1 in the group are then operated in the upstream-only mode or the sleep mode. Due to this configuration, it is possible to suppress a situation where non-cluster APs that are operated in the downstream-only mode and the upstream-only mode are geographically biased.

Figure 3:
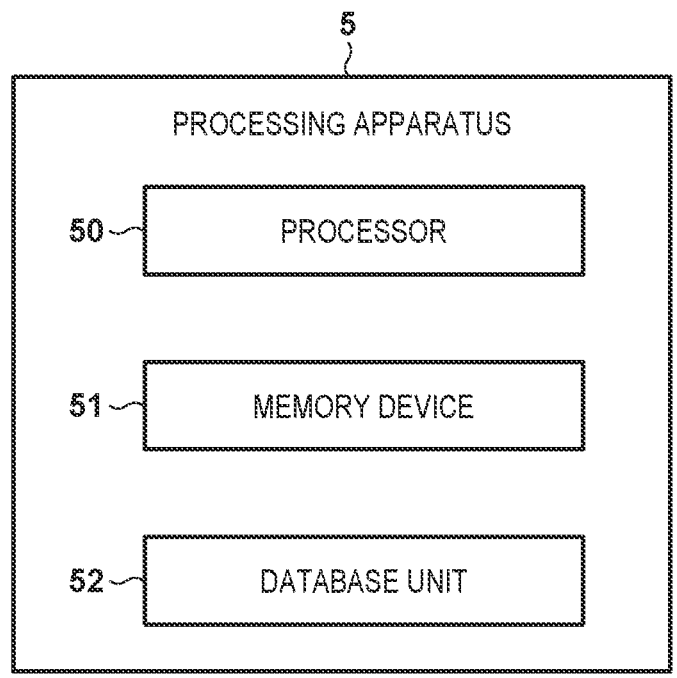
FIG. 3 is a diagram of a hardware configuration of a processing apparatus according to the embodiment.

FIG. 3 is a diagram of a configuration of a processing apparatus 5 according to the present embodiment. The processing apparatus 5 can be included in the CPU 3, for example. The processing apparatus 5 includes one or more processors 50, and at least one memory device 51 that stores a computer program. The at least one memory device 51 is a non-transitory computer-readable storage medium. The computer program includes an instruction for causing the one or more processors 50 to execute the processing in the CPU 3 described with reference to FIG. 2, when executed by the one or more processors 50.

The processing apparatus 5 also includes a database unit 52. The database unit 52 is a database indicating positions at which the APs 1 of the cell-free communication system are deployed. Note that the present disclosure is not limited to a configuration where the processing apparatus 5 includes the database unit 52. The database unit 52 can be included in an external apparatus accessible by the processing apparatus 5 via a network, for example.

Figure 4:
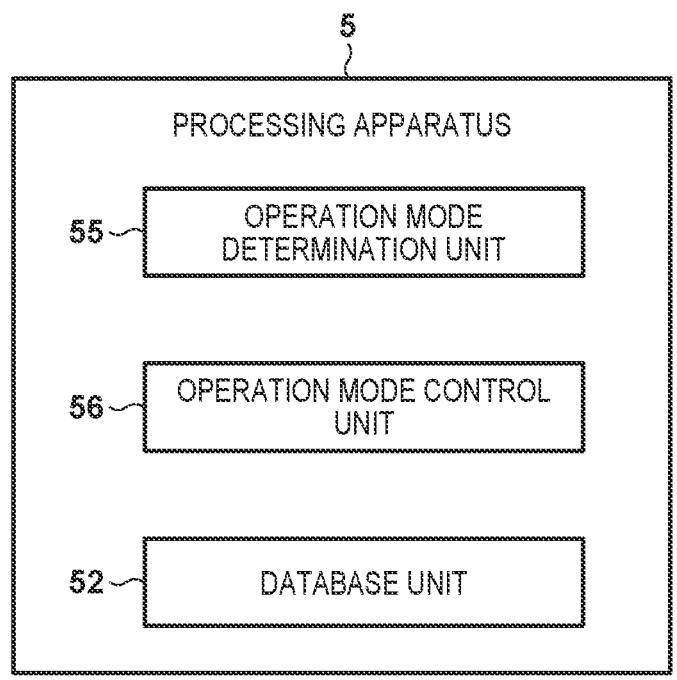
FIG. 4 is a diagram of functional blocks of the processing apparatus according to the embodiment.

FIG. 4 shows functional blocks that are realized in the processing apparatus 5 by the one or more processors 50 executing a computer program stored in the at least one memory device 51. As shown in FIG. 4, the one or more processors 50 function as an operation mode determination unit 55 and an operation mode control unit 56.

The operation mode determination unit 55 performs the processing shown in FIG. 2, and determines an operation mode of each AP 1. The operation mode control unit 56 controls the AP 1 such that the AP 1 operates in the operation mode determined by the operation mode determination unit 55.

Note that, according to the above embodiment, in the first processing, the CPU 3 sets, as targets of processing, one or more APs 1 that have changed from cluster APs to non-cluster APs, and a non-cluster AP to which the distance from one among the one or more APs 1 is within a threshold. However, the present disclosure is not limited to an aspect where a processing target AP is determined based on the distance from at least one AP 1 that has changed from a cluster AP to a non-cluster AP. One or more APs 1 that have changed from cluster APs to non-cluster APs, and a non-cluster AP for which the value of a path loss to one among the one or more APs 1 is within a predetermined value can be set as targets of processing, for example.

According to the present embodiment, a method performed by a processing apparatus of a cell-free communication system that includes a plurality of access points (APs), each of the plurality of APs are classified into a cluster AP and a non-cluster AP, the cluster AP being an AP that is included in a cluster, which is a set of APs and is associated with a wireless device, and the non-cluster AP being an AP that is not included in the cluster, is provided. The method includes: executing, when one or more first APs that are changed from the cluster AP to the non-cluster AP due to a change of the cluster occurs, first processing on one or more processing target APs including the one or more first APs and a second AP that is the non-cluster AP satisfying a predetermined condition in relation to the one or more first APs, and thereby determining, as an operation mode of the one or more processing target APs, one of a downstream-only mode in which no wireless signal is received, an upstream-only mode in which no wireless signal is transmitted, and a sleep mode in which no wireless signal is transmitted or received; and controlling the one or more processing target APs such that the one or more processing target APs operate in the operation mode determined in the first processing. The first processing includes: selecting one first processing target AP from the one or more processing target APs, and determining the downstream-only mode as the operation mode of the one first processing target AP, and determining the upstream-only mode or the sleep mode as the operation mode of a second processing target AP that is different from the one first processing target AP and is among the one or more processing target APs.

When a number of the one or more processing target APs is three or more, the one first processing target AP may be a processing target AP for which dispersion of distances from other processing target APs among the one or more processing target APs is the smallest. When a number of the one or more processing target APs is two or more, a number of second processing target APs whose operation mode is determined in the first processing as being the upstream-only mode may be the same as a number of the second processing target APs whose operation mode is determined as being the sleep mode, or larger than that by one.

The method may include: determining the operation mode of one or more third APs, each of which is the non-cluster APs among the plurality of APs, by executing a second processing in a predetermined cycle; and controlling the one or more third APs such that the one or more third APs operate in the operation mode determined in the second processing, wherein the second processing may include: determining a number of groups, grouping the one or more third APs into the determined number of groups based on positions where the one or more third APs are deployed, and executing the first processing on one or more fourth APs included in the group, as the one or more processing target APs.

The number of groups may be a function of a number of clusters of the cell-free communication system. The number of groups may become smaller as the number of cluster becomes larger. When the one or more first APs occurs after the second processing is performed and the first processing is then performed a predetermined number of times, the method may include executing the second processing in place of the first processing; and controlling the one or more third APs such that the one or more third APs operate in the operation mode determined in the second processing.

The method may include: determining a normal mode in which a wireless signal is transmitted/received, as the operation mode of one or more fifth APs, when the one or more fifth APs occurs as a result of being changed from the non-cluster AP to the cluster AP; and controlling the one or more fifth APs such that the one or more fifth APs operate in the normal mode. The predetermined condition may be satisfied if a distance from one of the one or more first APs is within a threshold value, or a path loss to one of the one or more first APs is within a predetermined value.

According to a second aspect of the present embodiment, a processing apparatus of a cell-free communication system that includes a plurality of access points (APs), each of the plurality of APs are classified into a cluster AP and a non-cluster AP, the cluster AP being an AP that is included in a cluster, which is a set of APs and is associated with a wireless device, and the non-cluster AP being an AP that is not included in the cluster, is provided. The processing apparatus includes: one or more processors; and a memory device for storing a program. The program, when executed by the one or more processors, causes the processing apparatus to perform: executing, when one or more first APs that are changed from the cluster AP to the non-cluster AP due to a change of the cluster occurs, first processing on one or more processing target APs including the one or more first APs and a second AP that is the non-cluster AP satisfying a predetermined condition in relation to the one or more first APs, and thereby determining, as an operation mode of the one or more processing target APs, one of a downstream-only mode in which no wireless signal is received, an upstream-only mode in which no wireless signal is transmitted, and a sleep mode in which no wireless signal is transmitted or received; and controlling the one or more processing target APs such that the one or more processing target APs operate in the operation mode determined in the first processing. The first processing includes: selecting one first processing target AP from the one or more processing target APs, and determining the downstream-only mode as the operation mode of the one first processing target AP, and determining the upstream-only mode or the sleep mode as the operation mode of a second processing target AP that is different from the one first processing target AP and is among the one or more processing target APs.

According to a third aspect of the present embodiment, a non-transitory computer-readable storage medium that stores a program is provided. The program includes a program instruction for causing, when executed by one or more processors of a processing apparatus of a cell-free communication system that includes a plurality of access points (APs), each of the plurality of APs are classified into a cluster AP and a non-cluster AP, the cluster AP being an AP that is included in a cluster, which is a set of APs and is associated with a wireless device, and the non-cluster AP being an AP that is not included in the cluster, the processing apparatus to perform: executing, when one or more first APs that are changed from the cluster AP to the non-cluster AP due to a change of the cluster occurs, first processing on one or more processing target APs including the one or more first APs and a second AP that is the non-cluster AP satisfying a predetermined condition in relation to the one or more first APs, and thereby determining, as an operation mode of the one or more processing target APs, one of a downstream-only mode in which no wireless signal is received, an upstream-only mode in which no wireless signal is transmitted, and a sleep mode in which no wireless signal is transmitted or received; and controlling the one or more processing target APs such that the one or more processing target APs operate in the operation mode determined in the first processing. The first processing includes: selecting one first processing target AP from the one or more processing target APs, and determining the downstream-only mode as the operation mode of the one first processing target AP, and determining the upstream-only mode or the sleep mode as the operation mode of a second processing target AP that is different from the one first processing target AP and is among the one or more processing target APs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method performed by a processing apparatus of a cell-free communication system that includes a plurality of access points (APs), each of the plurality of APs are classified into a cluster AP and a non-cluster AP, the cluster AP being an AP that is included in a cluster, which is a set of APs and is associated with a wireless device, and the non-cluster AP being an AP that is not included in the cluster, the method comprising:
executing, when one or more first APs that are changed from the cluster AP to the non-cluster AP due to a change of the cluster occurs, first processing on one or more processing target APs including the one or more first APs and a second AP that is the non-cluster AP satisfying a predetermined condition in relation to the one or more first APs, and thereby determining, as an operation mode of the one or more processing target APs, one of a downstream-only mode in which no wireless signal is received, an upstream-only mode in which no wireless signal is transmitted, and a sleep mode in which no wireless signal is transmitted or received; and
controlling the one or more processing target APs such that the one or more processing target APs operate in the operation mode determined in the first processing,
wherein the first processing includes:
selecting one first processing target AP from the one or more processing target APs, and determining the downstream-only mode as the operation mode of the one first processing target AP, and
determining the upstream-only mode or the sleep mode as the operation mode of a second processing target AP that is different from the one first processing target AP and is among the one or more processing target APs.

2. The method according to claim 1,
wherein, when a number of the one or more processing target APs is three or more,
the one first processing target AP is a processing target AP for which dispersion of distances from other processing target APs among the one or more processing target APs is the smallest.

3. The method according to claim 1,
wherein, when a number of the one or more processing target APs is two or more,
a number of second processing target APs whose operation mode is determined in the first processing as being the upstream-only mode is the same as a number of the second processing target APs whose operation mode is determined as being the sleep mode, or larger than that by one.

4. The method according to claim 1, further comprising:
determining the operation mode of one or more third APs, each of which is the non-cluster APs among the plurality of APs, by executing a second processing in a predetermined cycle; and
controlling the one or more third APs such that the one or more third APs operate in the operation mode determined in the second processing,
wherein the second processing includes:
determining a number of groups,
grouping the one or more third APs into the determined number of groups based on positions where the one or more third APs are deployed, and
executing the first processing on one or more fourth APs included in the group, as the one or more processing target APs.

5. The method according to claim 4,
wherein the number of groups is a function of a number of clusters of the cell-free communication system.

6. The method according to claim 5,
wherein the number of groups becomes smaller as the number of cluster becomes larger.

7. The method according to claim 4, further comprising:
when the one or more first APs occurs after the second processing is performed and the first processing is then performed a predetermined number of times,
executing the second processing in place of the first processing; and
controlling the one or more third APs such that the one or more third APs operate in the operation mode determined in the second processing.

8. The method according to claim 1, further comprising:
determining a normal mode in which a wireless signal is transmitted/received, as the operation mode of one or more fifth APs, when the one or more fifth APs occurs as a result of being changed from the non-cluster AP to the cluster AP; and
controlling the one or more fifth APs such that the one or more fifth APs operate in the normal mode.

9. The method according to claim 1,
wherein the predetermined condition is satisfied if a distance from one of the one or more first APs is within a threshold value, or a path loss to one of the one or more first APs is within a predetermined value.

10. A processing apparatus of a cell-free communication system that includes a plurality of access points (APs), each of the plurality of APs are classified into a cluster AP and a non-cluster AP, the cluster AP being an AP that is included in a cluster, which is a set of APs and is associated with a wireless device, and the non-cluster AP being an AP that is not included in the cluster, the processing apparatus comprising:
one or more processors; and
a memory device for storing a program,
wherein, when executed by the one or more processors, the program causes the processing apparatus to perform:
executing, when one or more first APs that are changed from the cluster AP to the non-cluster AP due to a change of the cluster occurs, first processing on one or more processing target APs including the one or more first APs and a second AP that is the non-cluster AP satisfying a predetermined condition in relation to the one or more first APs, and thereby determining, as an operation mode of the one or more processing target APs, one of a downstream-only mode in which no wireless signal is received, an upstream-only mode in which no wireless signal is transmitted, and a sleep mode in which no wireless signal is transmitted or received; and
controlling the one or more processing target APs such that the one or more processing target APs operate in the operation mode determined in the first processing,
wherein the first processing includes:
selecting one first processing target AP from the one or more processing target APs, and determining the downstream-only mode as the operation mode of the one first processing target AP, and
determining the upstream-only mode or the sleep mode as the operation mode of a second processing target AP that is different from the one first processing target AP and is among the one or more processing target APs.

11. A non-transitory computer-readable storage medium that stores a program, the program including a program instruction for causing, when executed by one or more processors of a processing apparatus of a cell-free communication system that includes a plurality of access points (APs), each of the plurality of APs are classified into a cluster AP and a non-cluster AP, the cluster AP being an AP that is included in a cluster, which is a set of APs and is associated with a wireless device, and the non-cluster AP being an AP that is not included in the cluster, the processing apparatus to perform:

executing, when one or more first APs that are changed from the cluster AP to the non-cluster AP due to a change of the cluster occurs, first processing on one or more processing target APs including the one or more first APs and a second AP that is the non-cluster AP satisfying a predetermined condition in relation to the one or more first APs, and thereby determining, as an operation mode of the one or more processing target APs, one of a downstream-only mode in which no wireless signal is received, an upstream-only mode in which no wireless signal is transmitted, and a sleep mode in which no wireless signal is transmitted or received; and controlling the one or more processing target APs such that the one or more processing target APs operate in the operation mode determined in the first processing, wherein the first processing includes:

selecting one first processing target AP from the one or more processing target APs, and determining the downstream-only mode as the operation mode of the one first processing target AP, and determining the upstream-only mode or the sleep mode as the operation mode of a second processing target AP that is different from the one first processing target AP and is among the one or more processing target APs.

* * * * *